(12) United States Patent
Gill et al.

(10) Patent No.: US 10,926,708 B2
(45) Date of Patent: Feb. 23, 2021

(54) SECOND ROW UNDER-SEAT STORAGE ACCESSORY

(71) Applicant: ABC TECHNOLOGIES INC., Toronto (CA)

(72) Inventors: Harman Gill, Brampton (CA); Bruce Bober, Farmington Hills, MI (US); Usman Dulatov, Newmarket (CA); Kulbir Singh Dhillon, Caledon (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 16/516,059

(22) Filed: Jul. 18, 2019

(65) Prior Publication Data

US 2020/0023782 A1 Jan. 23, 2020

Related U.S. Application Data

(60) Provisional application No. 62/700,053, filed on Jul. 18, 2018.

(51) Int. Cl.
*B60R 7/04* (2006.01)
*B60N 2/02* (2006.01)

(52) U.S. Cl.
CPC .............. *B60R 7/043* (2013.01); *B60N 2/02* (2013.01)

(58) Field of Classification Search
CPC ...... B60R 7/043; B60N 2/02; B60N 2205/35; B60N 2/305
USPC ...................................... 296/37.15
See application file for complete search history.

(56) References Cited

U.S. PATENT DOCUMENTS

| 5,667,115 | A | 9/1997 | Verhaeg | |
| 5,902,009 | A * | 5/1999 | Singh | B60N 2/90 297/188.1 |
| 7,121,606 | B2 | 10/2006 | Khan et al. | |
| 9,016,749 | B2 * | 4/2015 | Mueller | B60R 7/04 296/37.15 |
| 2004/0149791 | A1 * | 8/2004 | Tuel, Jr. | B60R 7/043 224/275 |

* cited by examiner

*Primary Examiner* — Pinel E Romain
(74) *Attorney, Agent, or Firm* — Medler Ferro Woodhouse & Mills PLLC

(57) ABSTRACT

A storage accessory for placement under a vehicle seat. The storage accessory comprises a first storage compartment, a second storage compartment, and a tray assembly for supporting the first and second storage compartments. At least one of the first and second storage compartments is removable from the tray assembly to serve as a stand-alone storage box when removed from the vehicle. The at least one removable storage compartment includes a lock handle that permits the at least one removable storage compartment to be releasably and securely attached to the tray assembly.

12 Claims, 21 Drawing Sheets

SECOND ROW UNDER-SEAT STORAGE ACCESSORY

FIELD

The present disclosure pertains to a storage accessory for use in vehicles, and in particular a storage accessory intended for use under the second row of seats.

BACKGROUND

Vehicle storage containers are used to store items such as jumper cables, flashlights, bags, firearms, hunting accessories, rope, sports equipment, and consumer electronics goods. It is preferable to store such items in a manner that largely renders them out of sight, to keep the interior of the vehicle looking clean and tidy, and to reduce the likelihood of theft. Close inspection of the vehicle interior shows a number of under-utilized spaces in which innovative storage solutions may be suitably implemented. This is especially applicable to vehicles that do not have a traditional rearward trunk, such as pickup trucks, minivans, SUV and off-road type vehicles.

SUMMARY

According to an embodiment, provided is a storage accessory for placement under a vehicle seat. The storage accessory comprises a first storage compartment, a second storage compartment, and a tray assembly for supporting the first and second storage compartments. At least one of the first and second storage compartments is removable from the tray assembly to serve as a stand-alone storage box when removed from the vehicle. The at least one removable storage compartment includes a lock handle that permits the at least one removable storage compartment to be releasably and securely attached to the tray assembly.

BRIEF DESCRIPTION OF THE DRAWINGS

The foregoing and other features and advantages of the disclosure will be apparent from the following description of the disclosure as illustrated in the accompanying drawings. The accompanying drawings, which are incorporated herein and form a part of the specification, further serve to explain the principles of the disclosure and to enable a person skilled in the pertinent art to make and use the disclosure. The drawings are not to scale.

DETAILED DESCRIPTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Furthermore, there is no intention to be bound by any expressed or implied theory presented in the preceding technical field, brief summary or the following detailed description.

General Vehicle Structure

Figure 1A:
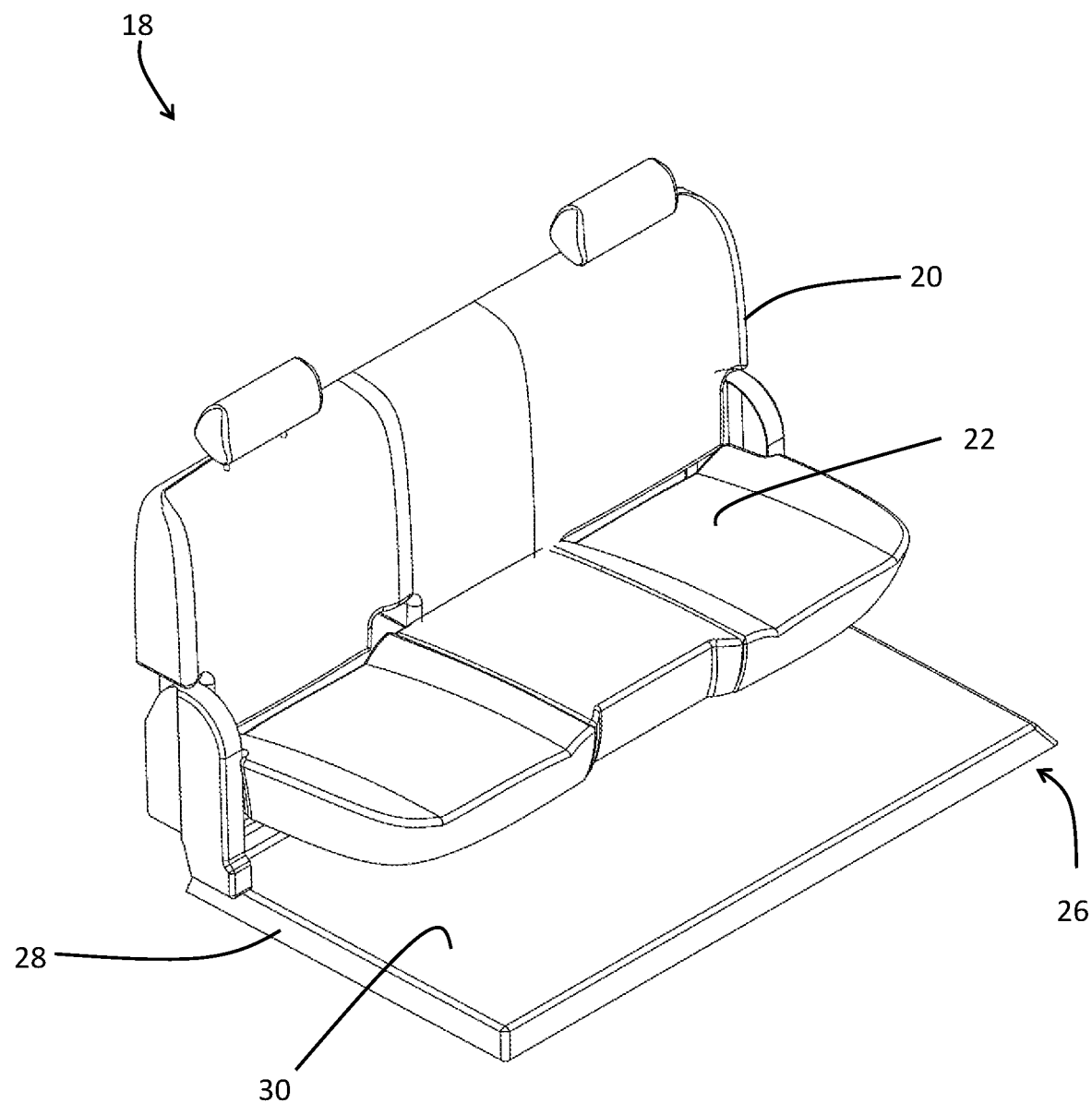
FIG. 1a is a perspective view of the interior of a vehicle, illustrating a second row of seats.
Figure 1B:
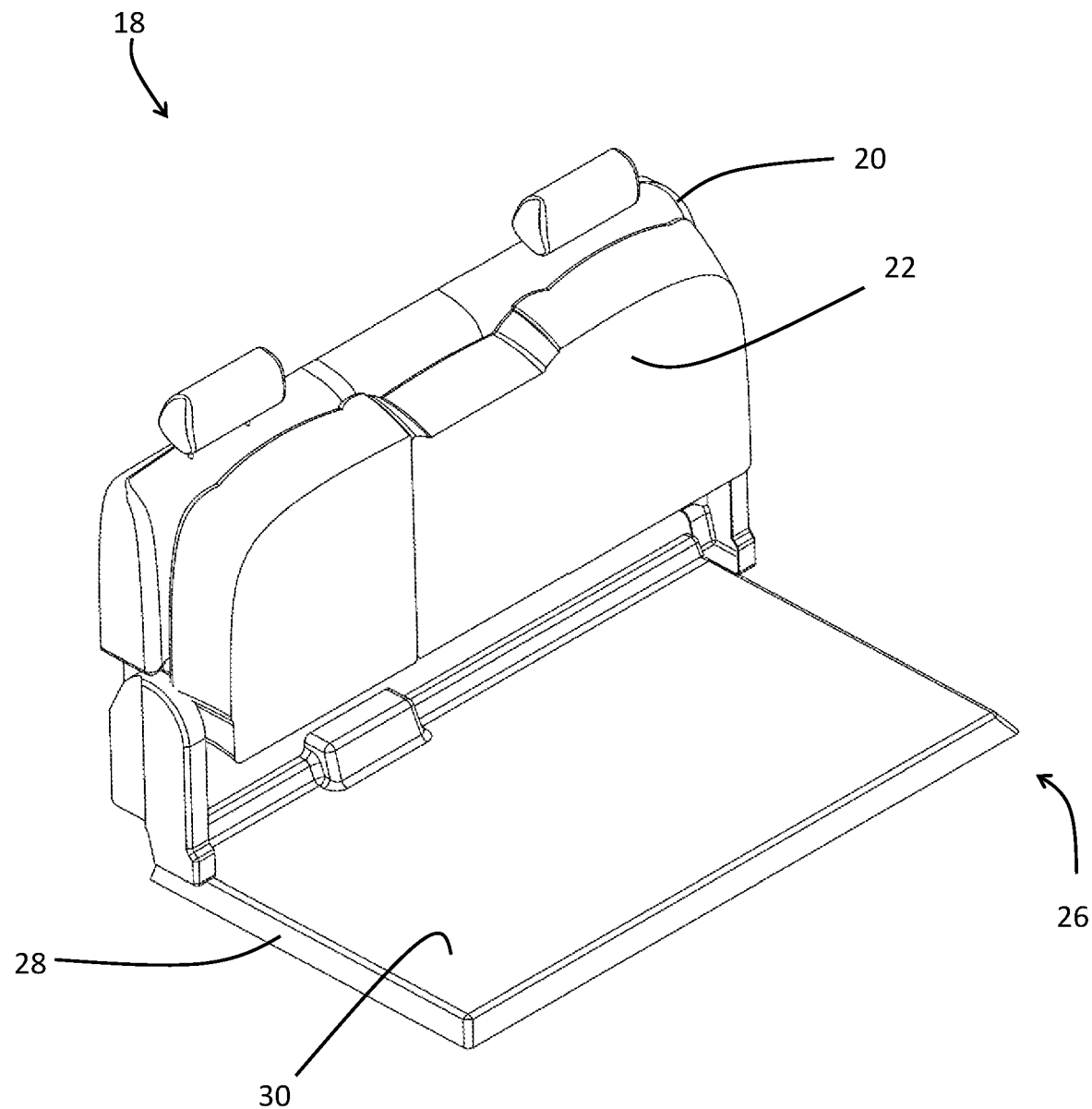
FIG. 1b is a perspective view of the interior shown in FIG. 1a, illustrating a sitting portion of the second row of seats in an up position, giving access to the area under the seats.

Turning now to FIGS. 1a and 1b, shown is a portion of an interior 18 of a vehicle, in particular a pickup truck, minivan, SUV or off-road type of vehicle. In a conventional vehicle, the interior includes a series of seats, arranged in rows, to receive occupants intended to be transported within the interior of the vehicle. The interior will generally include a first row of seats (not shown) and a second row of seats 20. The first row of seats will provide a driver seat that permits a driver occupant to control the vehicle in operation. The first row of seats will also provide a passenger seat situated generally adjacent or otherwise beside the driver seat. The second row of seats 20 is located behind the first row of seats, and is generally configured to receive an additional two or three passenger occupants. In some arrangements, a vehicle may include a third row of seats (not shown), also configured to receive an additional two or three passenger occupants. It will be appreciated that the invention disclosed herein is not intended to be limited to a vehicle having only first and second rows of seats, but may be applied to any vehicle seating arrangement where one or more rows of seating are provided behind the first row of seats. As shown, FIGS. 1a and 1b show the second row of seats 20, with a sitting portion 22 of the seats in a down position in FIG. 1a and with the sitting portion 22 of the seats in an up position in FIG. 1b.

With specific reference now to FIGS. 1a and 1b, the second row of seats 20 is mounted upon a vehicle structure 26. The vehicle structure 26 includes, inter alia, a vehicle frame 28 and a vehicle floor 30. The second row of seats 20 may be mounted to the vehicle structure 26 in a variety of ways, as is conventional in vehicle construction. In general, the second row of seats 20 is mounted in a manner to be fixedly attached to the vehicle frame 28 of the vehicle structure 26.

Storage Accessory Construction

Figure 2:
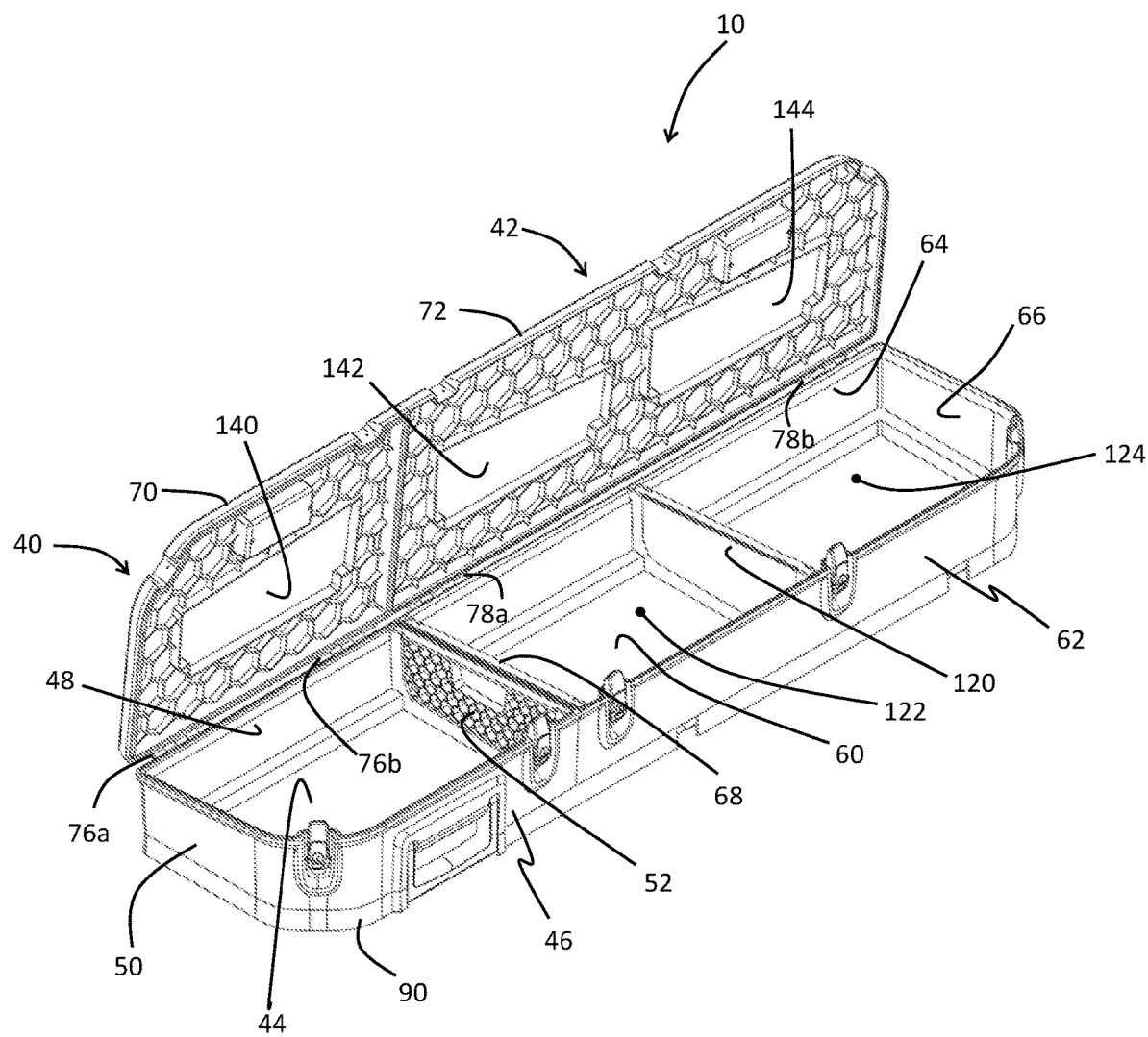
FIG. 2 is a perspective view of an embodiment of a storage accessory configured for placement in the area under the second row of seats.

Turning now to FIG. 2, illustrated is a storage accessory 10 for placement under the second row of seats 20. The storage accessory 10 includes a first storage compartment 40 and a second storage compartment 42. The first storage compartment (C1) 40 is defined by a generally horizontal C1 bottom wall 44, a generally vertical C1 forward wall 46, a generally vertical C1 rearward wall 48 and opposing generally vertical side walls, namely a first C1 side wall 50 and a second C1 side wall 52. Similarly, the second storage compartment (C2) 42 is defined by a generally horizontal C2 bottom wall 60, a generally vertical C2 forward wall 62, a generally vertical C2 rearward wall 64 and opposing generally vertical side walls, namely a first C2 side wall 66 and a second C2 side wall 68. The first and second storage compartments 40, 42 also include a respective lid. In particular, the first storage compartment 40 includes a C1 lid 70, while the second storage compartment 42 includes a C2 lid 72. Each of the C1 and C2 lids 70, 72 are attached to the respective first and second storage compartments 40, 42 using one or more suitable hinges. As shown, each of the C1 and C2 lids 70, 72 are attached to respective first and second storage compartments 40, 42 using a pair of hinges, namely a first pair of hinges 76a, 76b for the C1 lid 70, and a second pair of hinges 78a, 78b for the C2 lid 72. Although the hinged connection of the C1 and C2 lids 70, 72 to respective first and second storage compartments 40, 42 is shown using a pair of piano or barrel-type hinges, it will be appreciated that a variety of hinge designs may be suitably implemented, including a living hinge incorporated into the C1/C2 rearward wall 48, 64 of the respective first and second storage compartments 40, 42. Hinges may be made of materials including carbon steel, aluminum or its alloys, and/or engineered plastics including polyamide (PA), HDPE, ABS, PC-ABS, PP, or glass-fiber or carbon fiber reinforced composites of such materials. The hinges may be bonded, riveted, welded, or fastened by other mechanical means including but not limited to nuts, bolts & screws, to the respective lid/rearward wall. The C1 and C2 lids 70, 72 may each additionally include a lid handle 82 (see FIG. 4) to permit for easy manipulation of C1 and C2 lids 70, 72 during operation. In some embodiments, each of the first and second storage compartments 40, 42 may include a latch assembly to enable the user to securely close the storage compartments. As shown, the first storage compartment 40 is provided with a pair of latches 84, while the second storage compartment is provided with three latches 86. A variety of latches can be used for this purpose, with the intention being the secure closure of the lid upon the receiving compartment structure. In some embodiments, one or both of the first and second storage compartments 40, 42 may be provided with at least one lockable latch, to permit the user to lock the storage compartment when needed.

Tray Assembly

Figure 3:
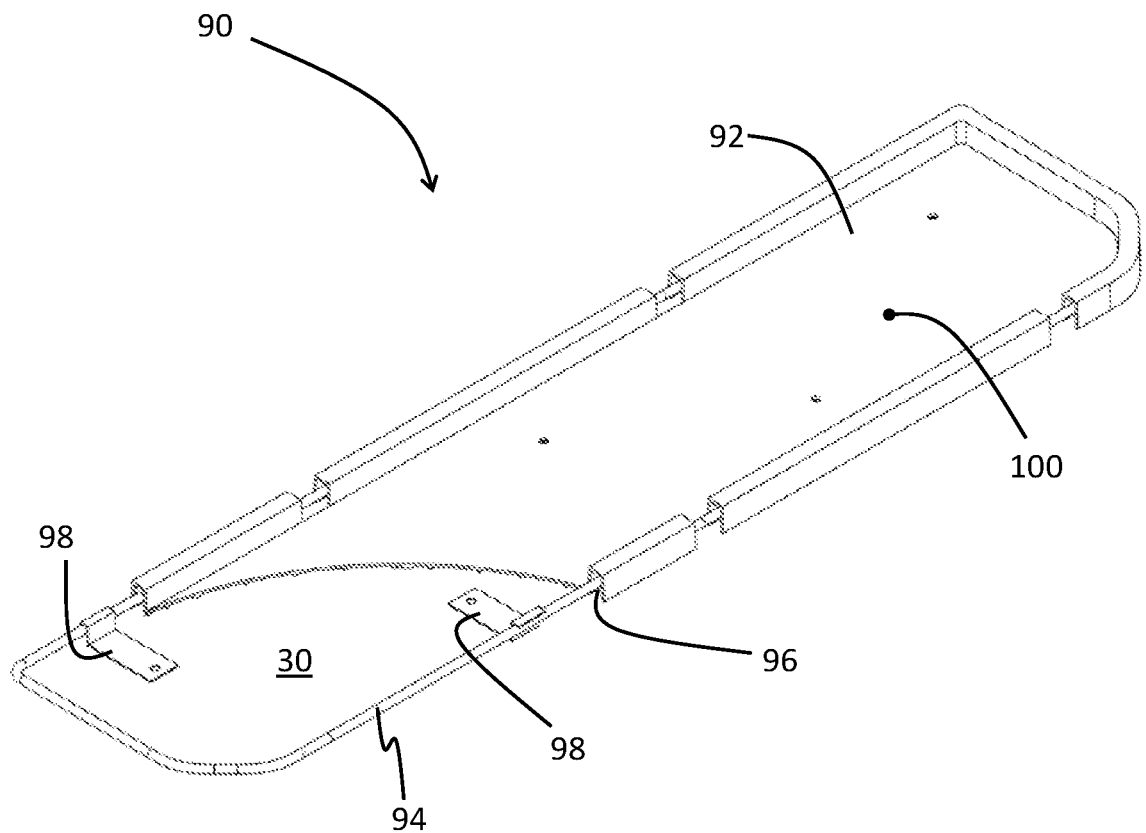
FIG. 3 is a partial sectional perspective view of a tray assembly of the storage accessory according to the embodiment of FIG. 2, the tray assembly configured for receiving a first storage compartment and a second storage compartment.

The first and second storage compartments 40, 42 are mounted upon a tray assembly 90 that is fixed to the vehicle floor 30. With regard to FIG. 3, the tray assembly 90 includes a mounting pan 92 and a frame member 94. The frame member 94 is constructed from a metallic rod, or an injection molded engineered plastic, and is configured to run within a channel 96 formed along the outer perimeter of the mounting tray 92. The frame member 94 is fixed to the vehicle floor 30 using features such as hard-points on the vehicle's frame structure, fixed bracketry that has been welded on, and/or removable bracketry that has been affixed through other means such as fasteners, bonding, or riveting. As shown, the frame member 94 is fixed to the vehicle floor 30 using a plurality of brackets 98, that may be welded or otherwise attached using a suitable fastening means. The brackets 98 may be made of materials compatible with the frame structure of the vehicle including, but not limited to carbon steel, aluminum or its alloys, and/or engineered plastics including but not limited to polyamide (PA), HDPE, ABS, PC-ABS, PP, or glass-fiber or carbon fiber reinforced composites of such materials.

The mounting pan 92 itself may be attached to the frame member 94 via snap features, fasteners such as screws, nuts and bolts, hook & loop fastening devices, magnets, or other suitable means to connect the mounting pan 92 to the frame member 94, and thereby to the vehicle floor 30. The mounting pan 92 is generally single-component structure that may be formed of any suitable material, including but not limited to carbon steel, aluminum or its alloys, and/or engineered plastics including but not limited to polyamide (PA), HDPE, ABS, PC-ABS, PP, or glass-fiber or carbon fiber reinforced composites of such materials. Composite sandwich laminate structures such as reinforced paper, metal or polymer honeycomb boards (PCB) may also be used in the construction of the mounting pan 92.

The channels 96 that form the periphery of the mounting pan 92 delineate a central recessed area 100 suitable for receiving the first and second storage compartments 40, 42. In addition, the central recessed area 100 and/or the selection of materials for the mounting pan 92 may serve to provide water-resistant or water-proof storage of goods such as boots, coats, or other goods, that may, for any purpose, need to be isolated from the rest of the floor areas of the vehicle.

Figure 4:
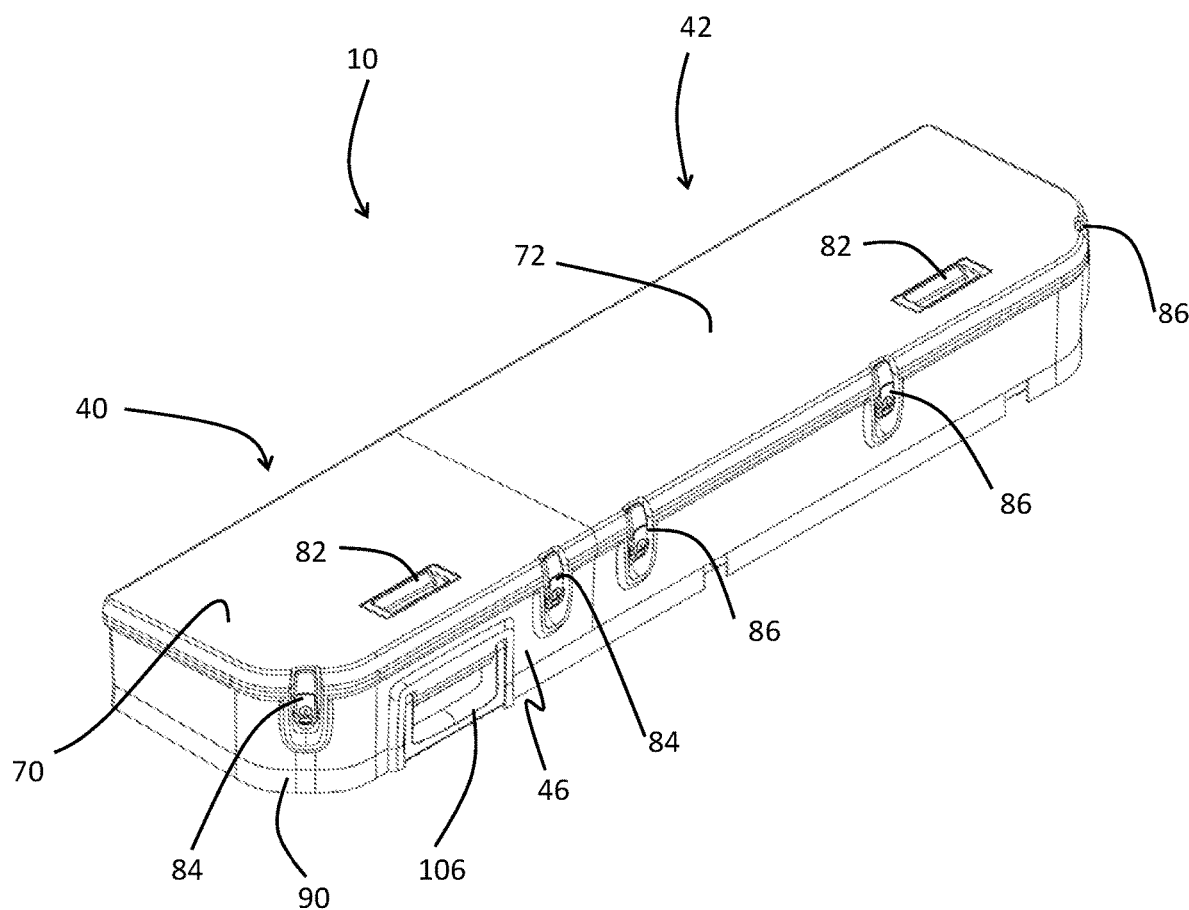
FIG. 4 is a perspective view of the storage accessory of FIG. 2, shown with lids in the closed position, and a lock handle in a locked position.

With reference now to FIG. 4, the first and second storage compartments 40, 42 are shown positioned in the tray assembly 90. The first and second storage compartments 40, 42 may each be attached, either in a fixed or removable manner, to the mounting pan 92 by any suitable means for attachment, including but not limited to bonding, fasteners such as nuts, bolts, screws, or other methods such as snap fits, interlocking brackets or channels, magnetic attachments, hook-and-loop fasteners, or other mechanical means. One or both of the first and second storage compartments 40, 42 may additionally include locating features (not shown) on the underside of the respective bottom wall that may be used to correctly position the compartment with respect to the mounting pan 92. These locating features may additionally serve to constrain the storage compartment from unintentional vertical and/or horizontal translation during operation of the vehicle.

Figure 5:
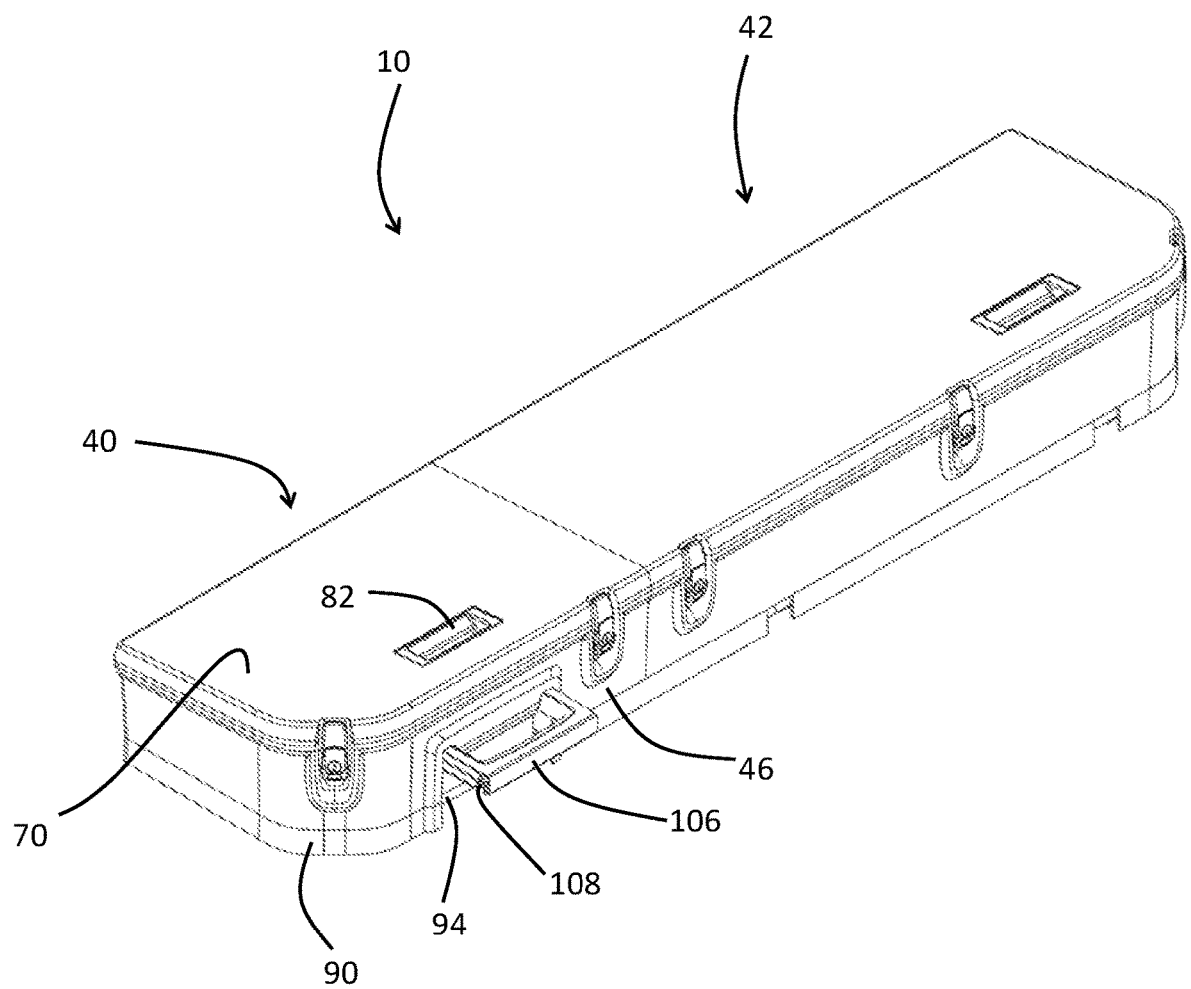
FIG. 5 is a perspective view of the storage accessory of FIG. 2, shown with the lock handle in a disengaged position.
Figure 6:
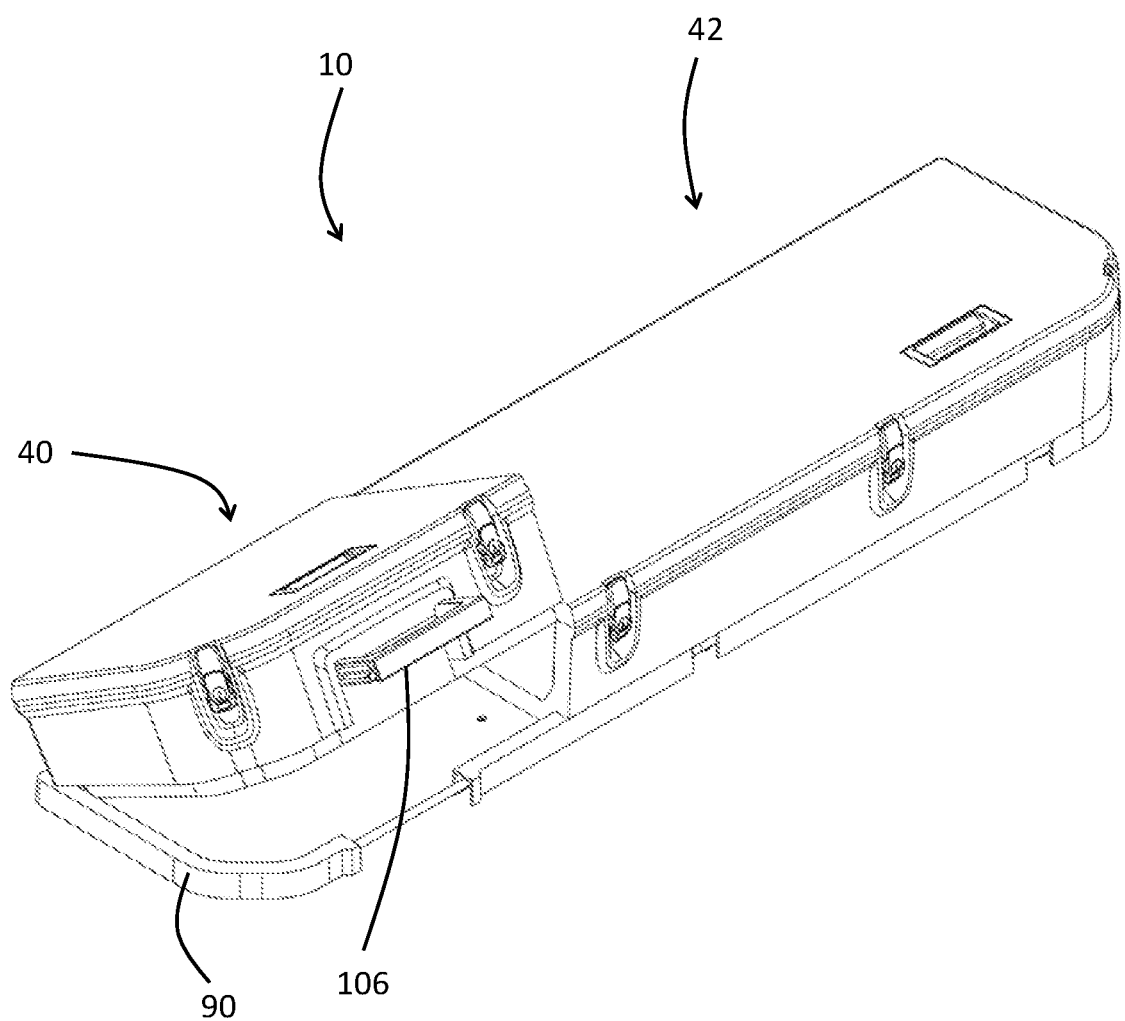
FIG. 6 is a perspective view of the storage accessory of FIG. 2, shown with the first storage compartment in an upwardly angled position relative to the tray assembly.
Figure 7:
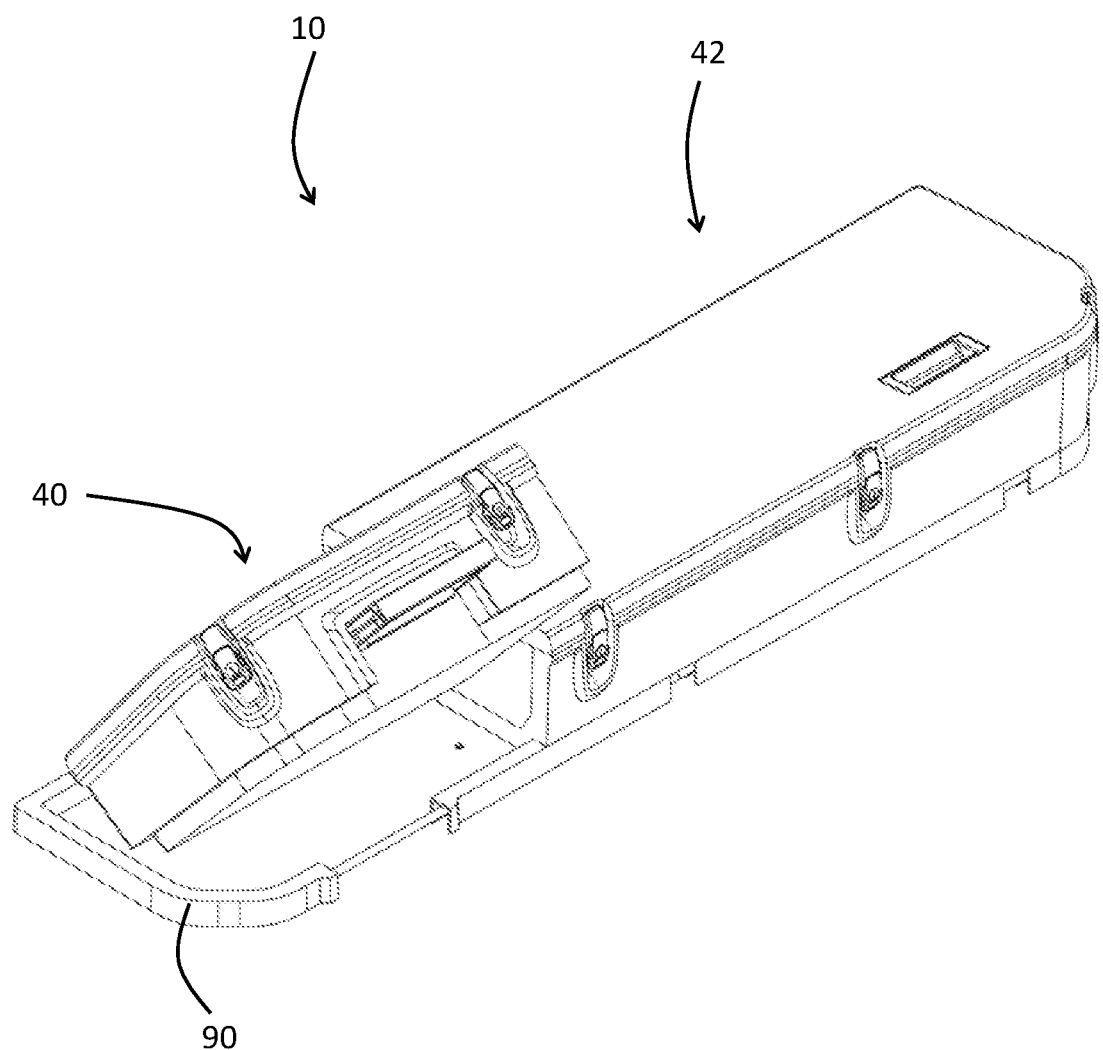
FIG. 7 is a perspective view of the storage accessory of FIG. 2, shown with the first storage compartment lifted from the tray assembly.
Figure 8A:
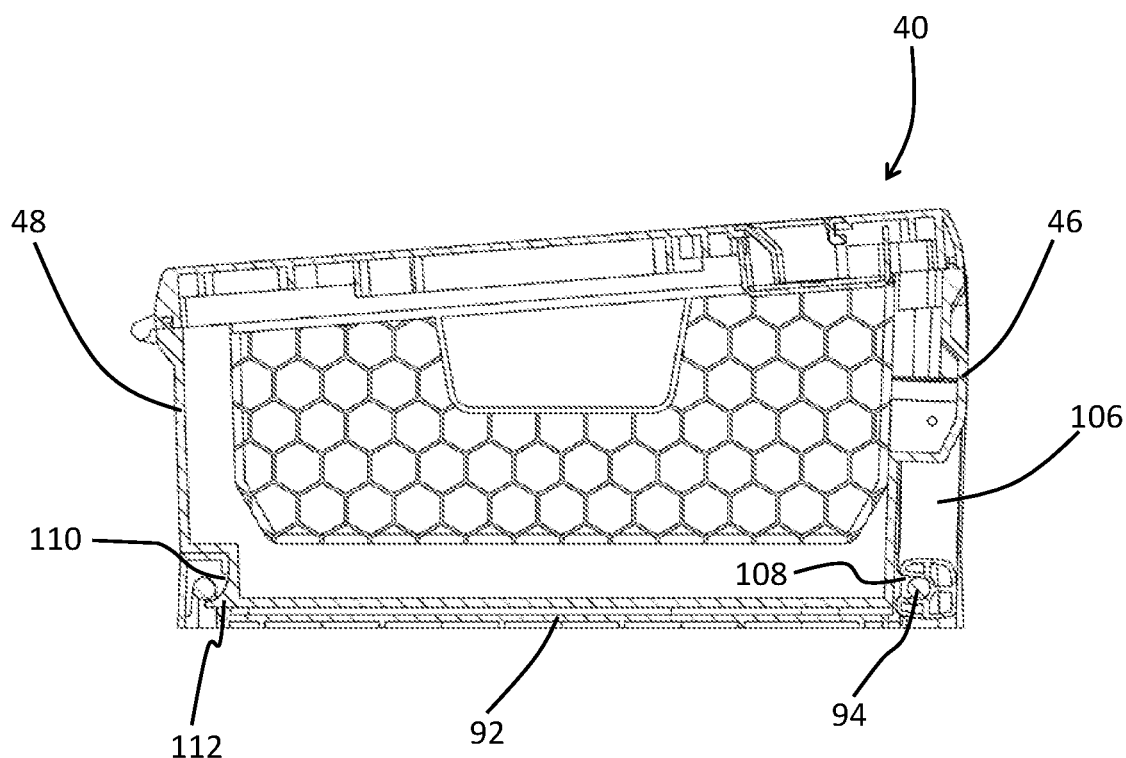
FIG. 8a is a side sectional view of the storage assembly of FIG. 2 taken through the first storage assembly, illustrating the arrangement of the lock handle relative to the tray assembly.
Figure 8B:
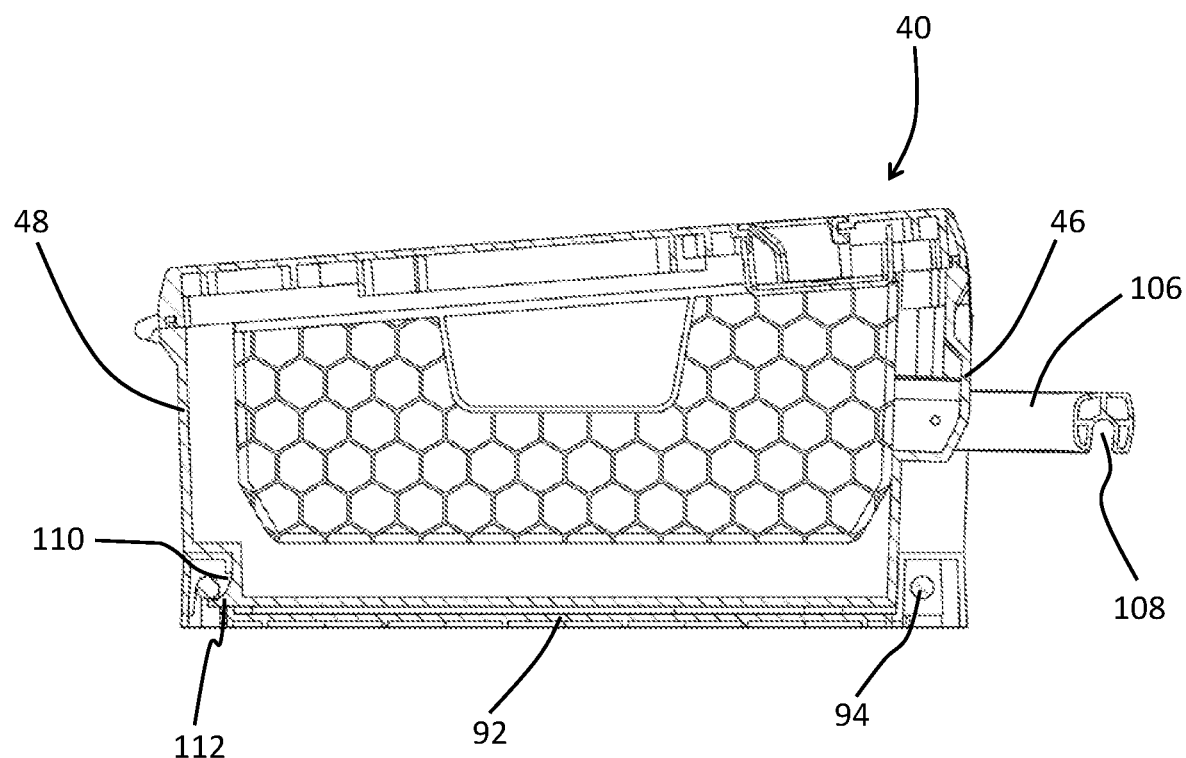
FIG. 8b is a side sectional view in accordance with FIG. 8a, showing the lock handle in the disengaged position.
Figure 8C:
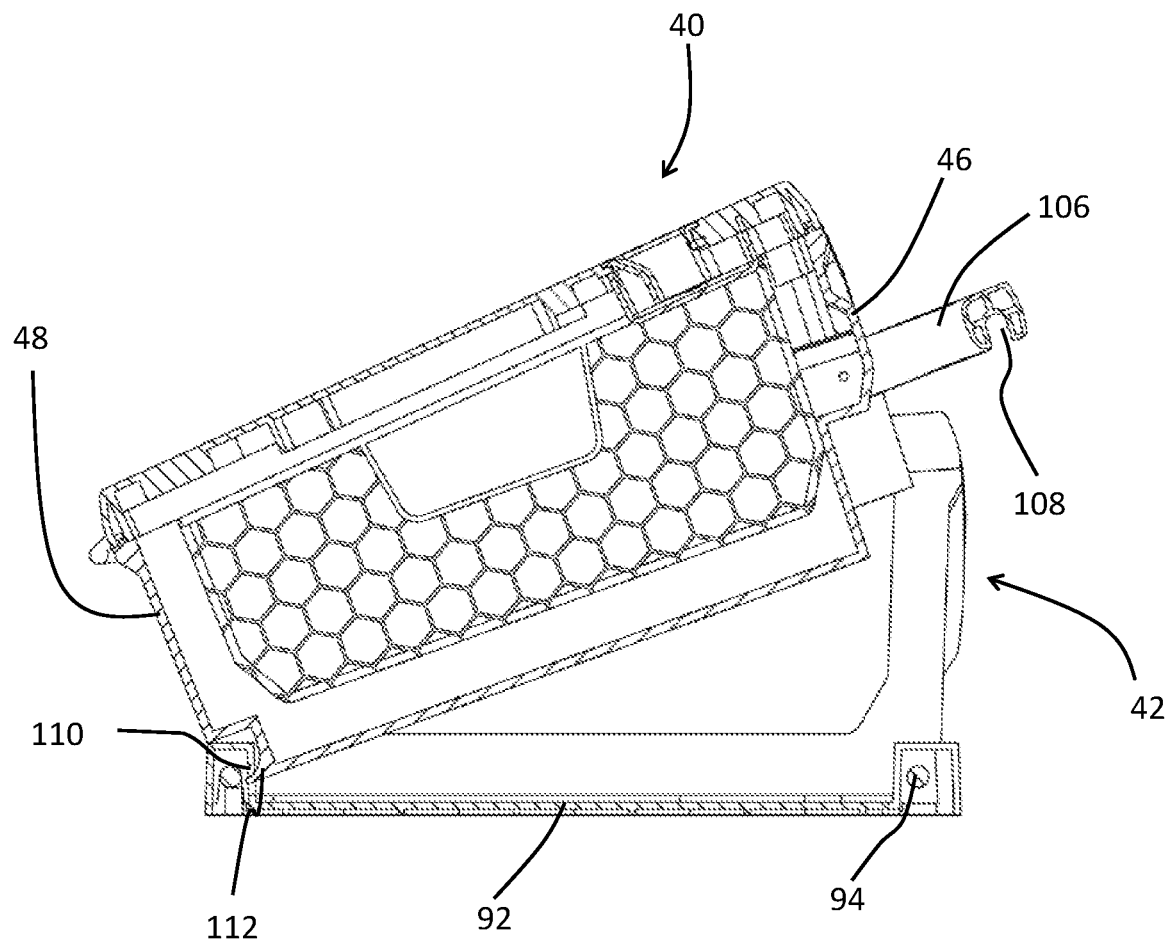
FIG. 8c is a side sectional view in accordance with FIG. 8a, showing the first storage compartment in an upwardly angled position.

In the embodiment shown, the second storage compartment 42 is configured to be fixedly attached to the mounting pan 92, using a suitable means for attachment, including but not limited to bonding, fasteners such as nuts, bolts, screws, or other methods such as snap fits, interlocking brackets or channels, magnetic attachments, hook-and-loop fasteners, or other mechanical means. The first storage compartment 40 is configured to be removable, to enable a user to lift the storage compartment 40 from the storage accessory 10 and take it with them when leaving the vehicle. FIGS. 5 through 7 show the first storage compartment 40 being removed from the storage accessory 10. The first step in removing the first storage compartment 40 from the mounting pan 92 is to unlatch a lock handle 106. The lock handle 106 is pivotally attached to the C1 forward wall 46, and is operable between a closed or locked position shown in FIG. 4 and an open or unlocked position shown in FIG. 5. The lock handle 106 includes a lock channel 108 configured to engage the frame member 94 when in the closed/locked position. Operation of the lock handle 106 is detailed in FIG. 8a which shows the lock handle 106 in the closed or locked position, FIG. 8b which shows the lock handle 106 in the open or unlocked position, and FIG. 8c which shows the lock handle 106 open or partially removed. In FIG. 8a, the lock handle 106 is positioned such that the lock channel 108 fully engages the frame member 94, therein preventing the forward portion of the first storage compartment 40 from lifting or otherwise displacing from the mounting pan 92. The lock handle 106 may be maintained in this locked position using a snap fit feature, magnets, or other suitable temporary attachment that may be overcome with reasonable human effort. Also shown in FIG. 8a is a rearward registration recess 110 on the mounting pan 92, the registration recess 110 being configured to receive a registration boss 112 formed as part of the C1 rearward wall 48 of the first storage compartment 40. The receipt of the registration boss 112 within the registration recess 110 similarly prevents the rearward portion of the first storage compartment 40 from lifting or otherwise displacing from the mounting pan 92 when fully seated within the mounting pan 92. To remove the first storage compartment 40 from the storage accessory 10, the lock handle 106 is rotated to the open/unlocked position, as shown in FIG. 8b. In this position, the lock channel 108 is fully disengaged from the frame member 94, permitting the forward portion of the first storage compartment 40 to be lifted from the mounting pan 92, as shown in FIG. 8c. In the partially lifted position, the first storage compartment 40 can be displaced forwardly to disengage the registration boss 110 from the registration recess 112, permitting the first storage compartment 40 to be lifted free from the mounting pan 92, as shown in FIG. 7. The lock handle 106 can then be used as a convenient means to carry the first storage compartment 40, which may in turn be used as a stand-alone storage box. To additionally enhance the use of the first storage compartment 40 additional carry handles may be provided, for example a carry handle (not shown) may be provided on the C1 rearward wall 48, to complement the lock handle 106, therein permitting the user to carry the storage container using two hands.

Walls/Dividers

Figure 9:
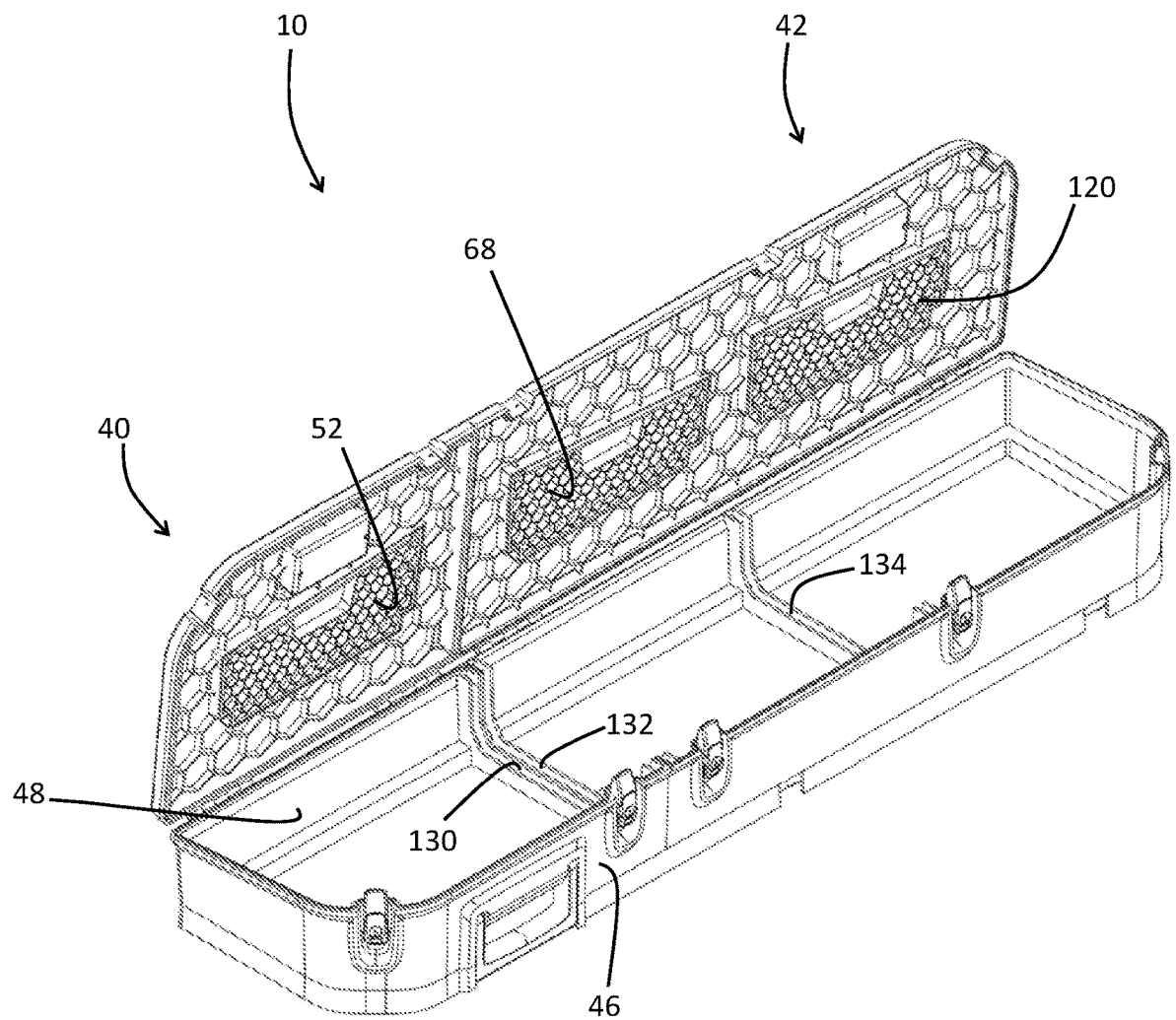
FIG. 9 is a perspective view of the storage assembly of FIG. 2, showing internal walls and a divider removed and stored in the respective lids.

Returning now to FIG. 2, the storage accessory is shown with the C1 and C2 lids 70, 72 in the open position. The perimeter walls of the storage accessory, namely the C1 forward wall 46, the C2 forward wall 62, the C1 rearward wall 48, the C2 rearward wall 64, the C1 first side wall 50 and the C2 first side wall 66 are fixed in position, that is they are not removable and form a permanent part of the respective compartment they belong to. In contrast, the C1 second side wall 52 and the C2 second side wall 68 are removable, to permit for a larger cargo space within the storage accessory when necessary. With reference to FIG. 9, the storage accessory 10 is shown with the C1 and C2 second side walls 52, 68 removed, providing a larger interior volume for the storage accessory. In some embodiments, one or more dividers may be provided to one or both of the first and second storage compartments. As shown in FIG. 2, a divider 120 is provided in the second storage compartment 42, situated to divide the second storage compartment 42 into two subcompartments, namely a first subcompartment 122, and a second subcompartment 124. As required by the user, the divider 120 may be removed from the second storage compartment 42 as shown in FIG. 9, such that the entirety of the interior volume of the storage accessory is in an undivided configuration. While the divider 120 is shown as spanning the space between the forward and rearward walls 62, 64, the implementation of dividers may take on a variety of configurations, and it is not intended to restrict the use of internal dividers to the arrangement exemplified here. To facilitate the placement and retention of the C1 and C2 second side walls 52, 68, and the divider 120, channels may be implemented. As shown, the C1 and C2 second side walls 52, 68 are retained in place by respective C1 and C2 wall channels 130, 132. Similarly, the divider 120 is retained in place by a divider channel 134. The wall and divider channels 130, 132, 134 are provided on at least portions of the rearward, bottom and forward walls of the respective first and second storage compartments 40, 42. In alternative embodiments, the placement and retention of the C1 and C2 second side walls 52, 68, and the divider 120 may be facilitated through the use of slots or grooved lips provided on at least portions of the rearward, bottom and forward walls of the respective first and second storage compartments 40, 42. In still further alternative embodiments, the placement and retention of the C1 and C2 second side walls 52, 68, and the divider 120 may be facilitated through the use of other mechanical means, including but not limited to magnets and snap fits.

For ease and convenience when storing the C1 and C2 second side walls 52, 68, and the divider 120, the C1 and C2 lids 70, 72 may be configured to receive the components in pockets or recesses formed on the underside of the lid. As shown in FIG. 2, the C1 lid 70 is provided with a first wall storage recess 140 configured to receive and store the C1 second side wall 52, as shown in FIG. 9. Similarly, as shown in FIG. 2, the C2 lid 72 is provided with second wall storage recess 142 configured to receive and store the C2 second side wall 68, and a divider storage recess 144 configured to receive and store the divider 120, as shown in FIG. 9. The side walls and divider may be retained in position within the respective storage recess using a temporary fastening fixture, or through a suitable snap-fit arrangement.

Under-Seat Arrangement

Figure 10A:
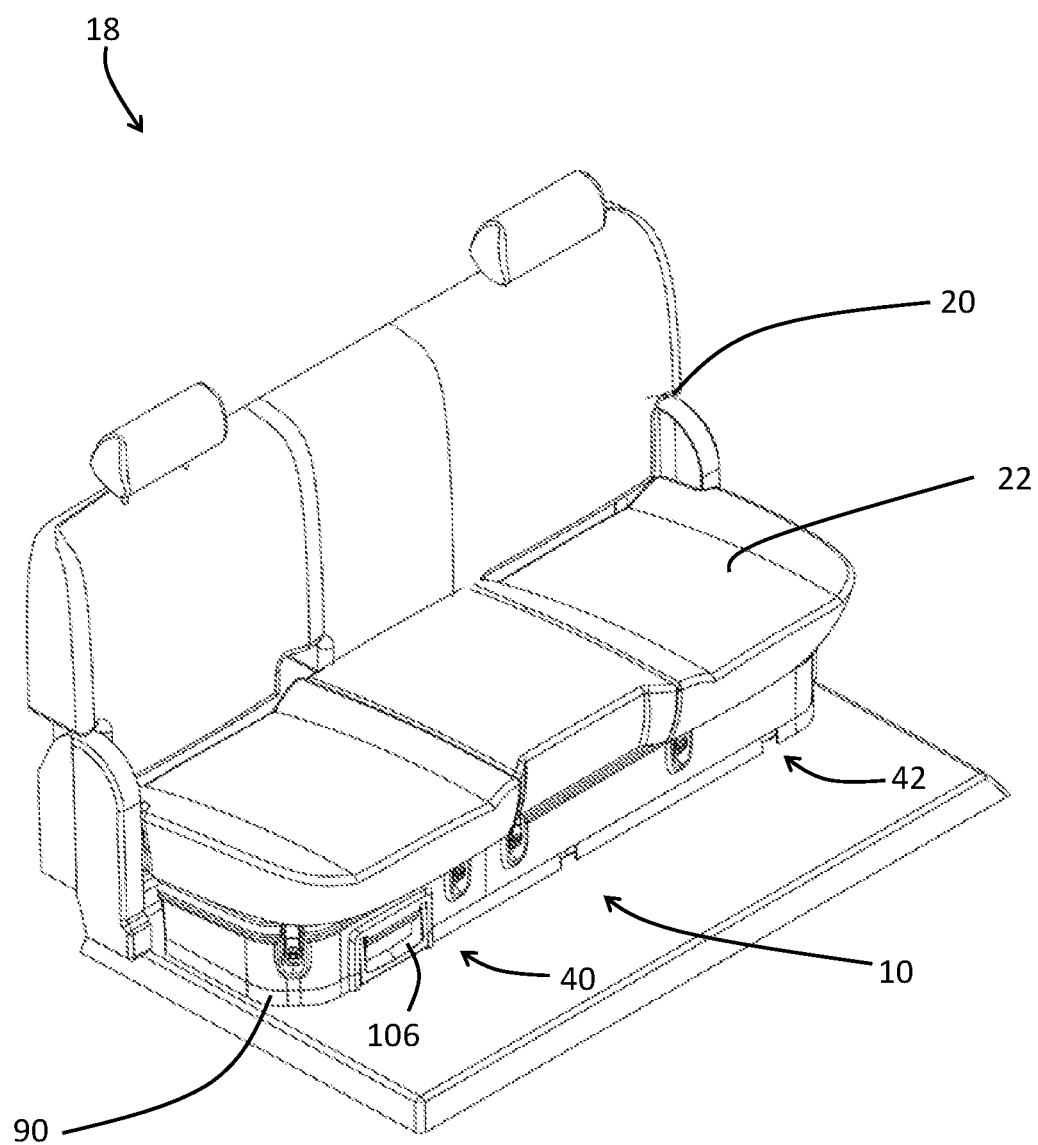
FIGS. 10a through 10f show the storage accessory of FIG. 2 in position under the second row of seats, illustrating the various stages of usage and removal of the removable storage compartment.
Figure 10B:
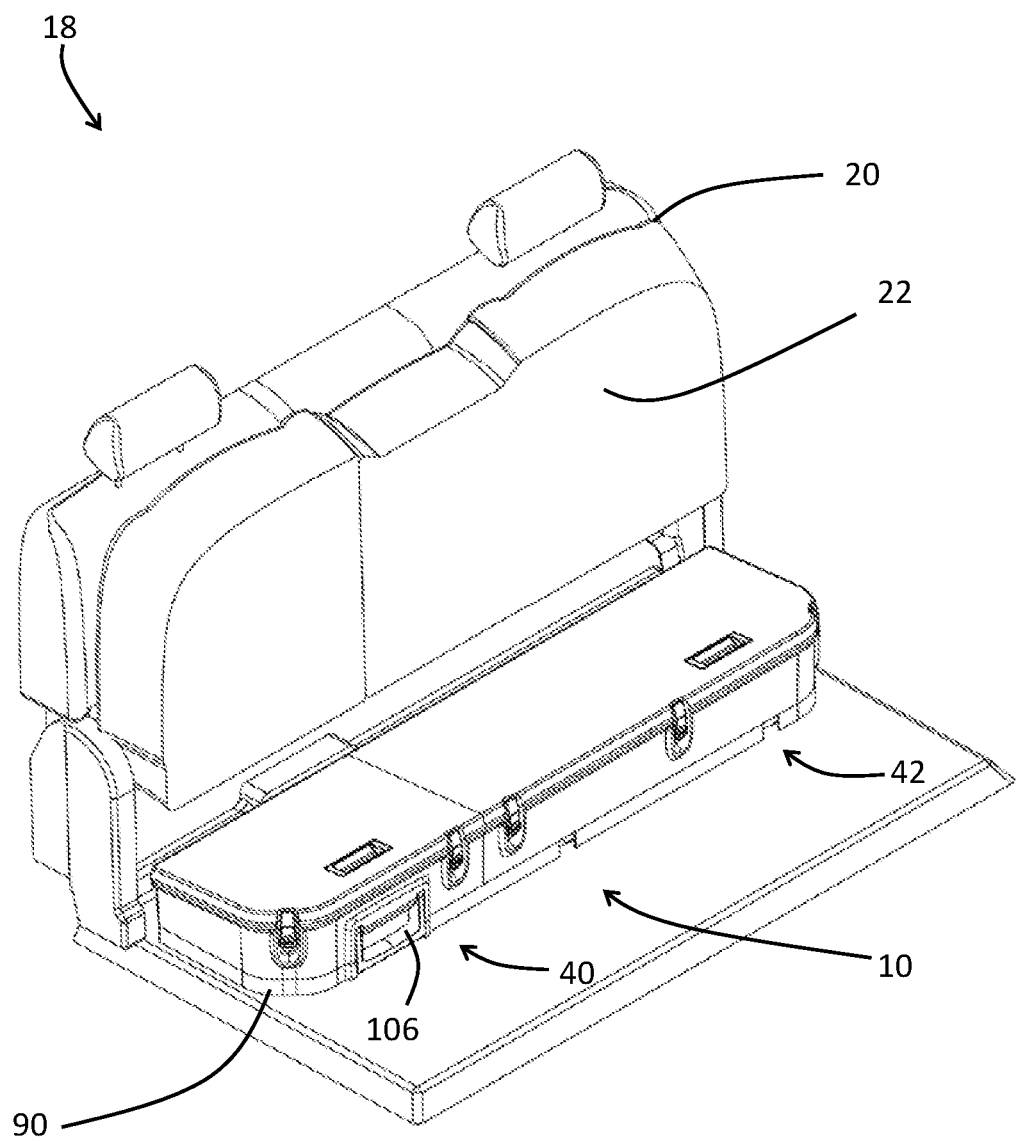
Figure 10C:
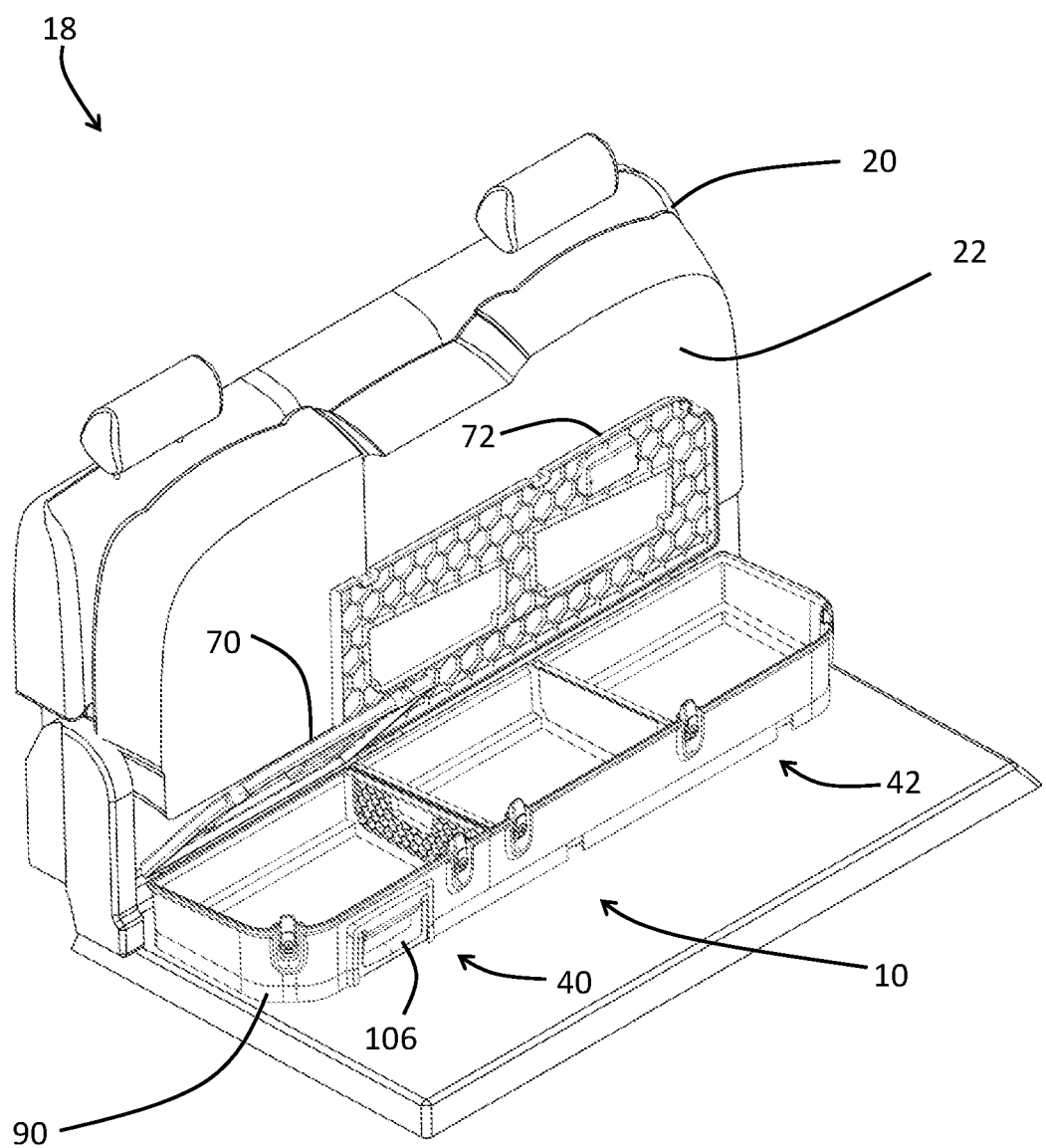
Figure 10D:
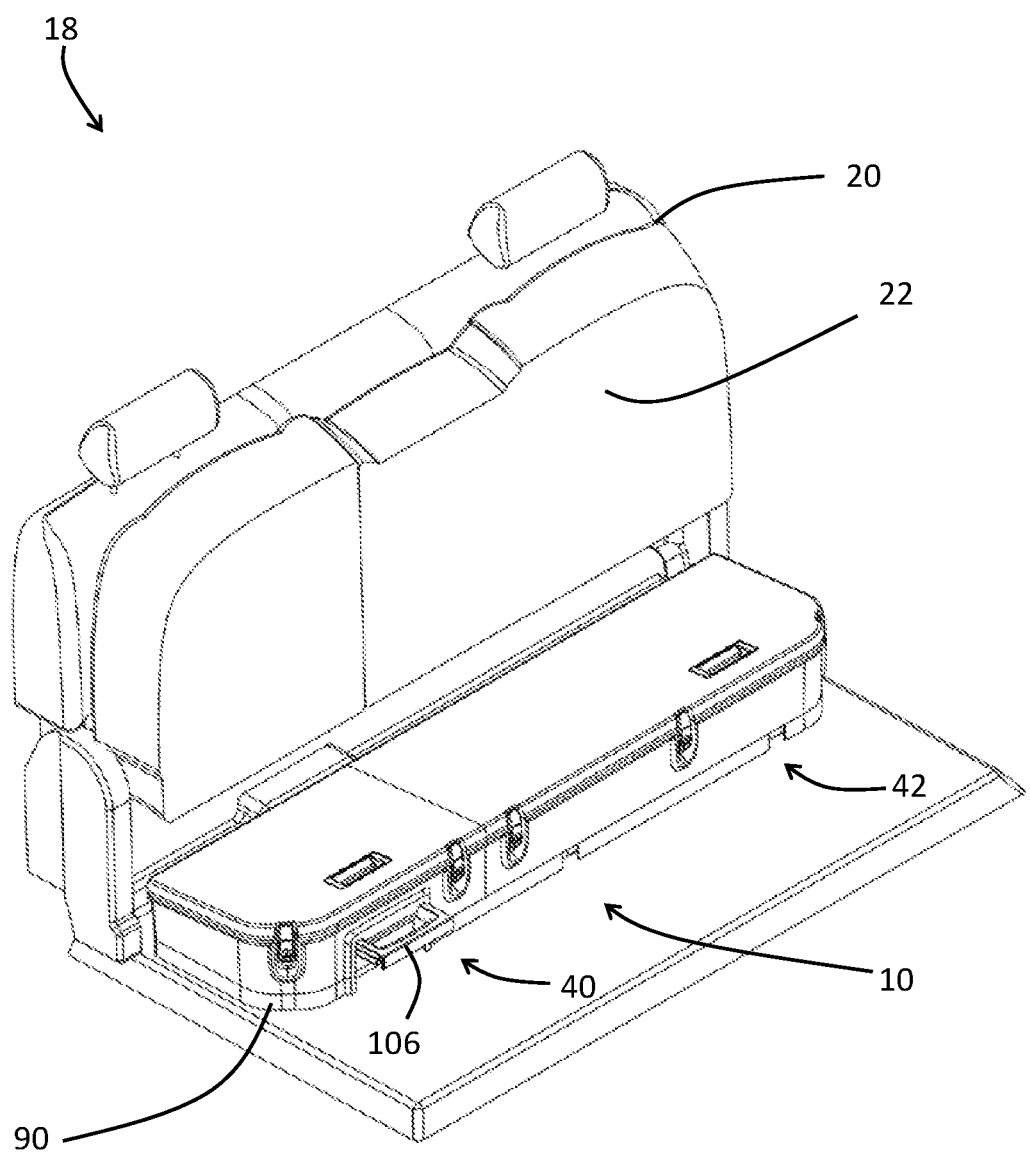
Figure 10E:
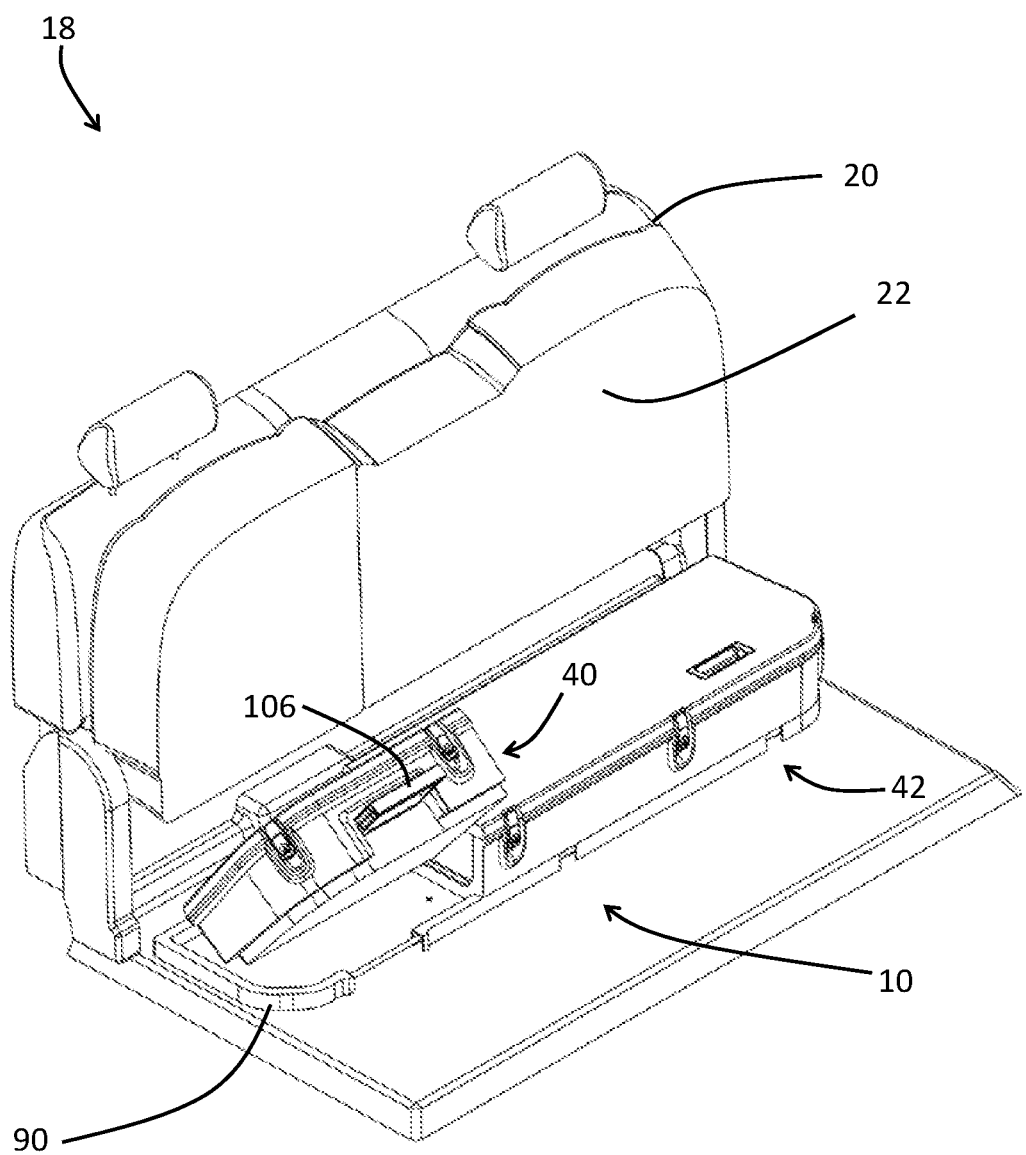
Figure 10F:
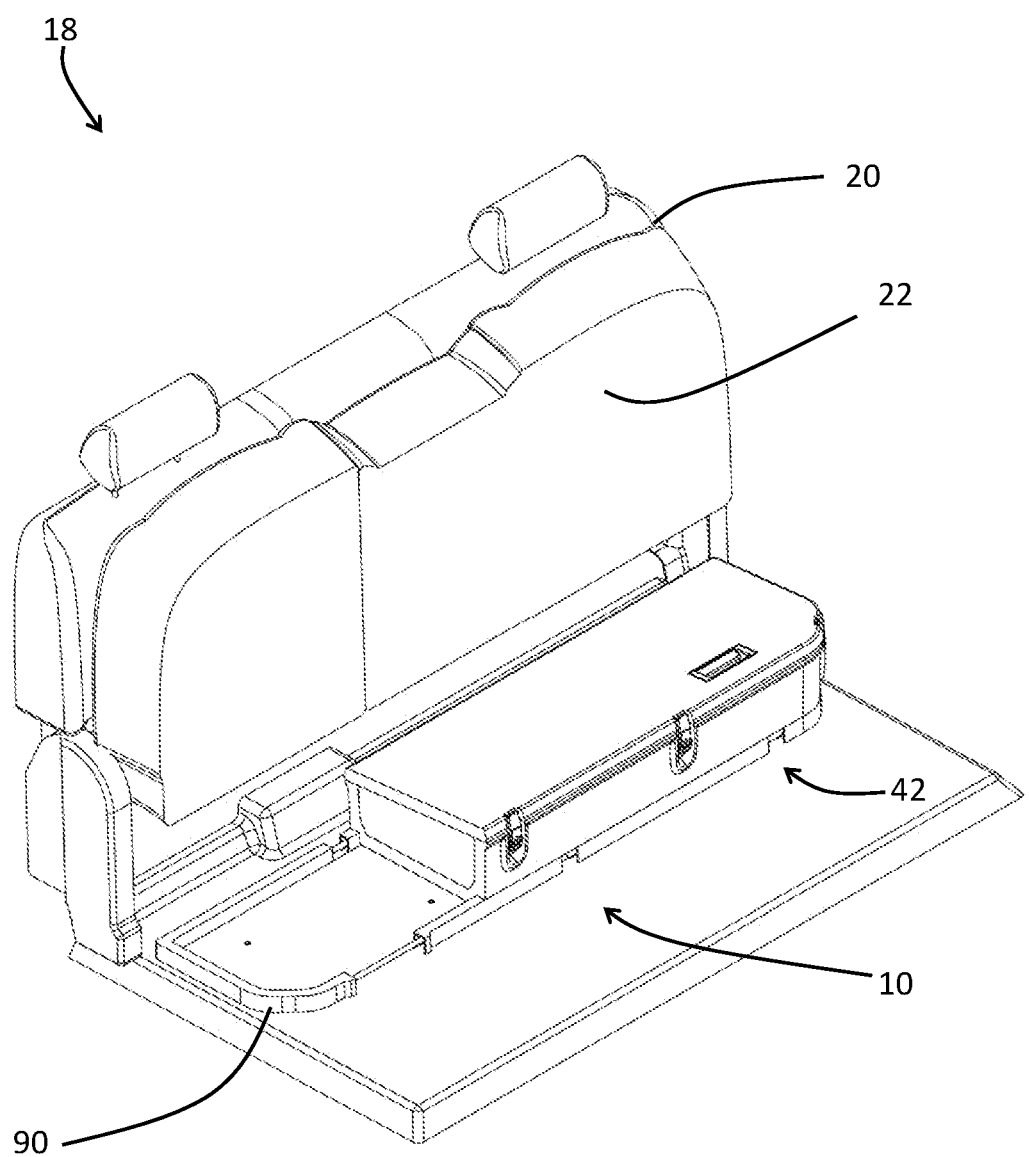

FIGS. 10a to 10f illustrate the storage accessory 10 positioned under the second row of seats 20. The storage accessory 10 does not interfere with the conventional usage of the seats, yet provides the convenience of contained storage when needed. To access the storage accessory 10, the sitting portion 22 of the seat is lifted, as shown in FIG. 10b. Where the seat is arranged as a 60/40 split seat, the storage accessory 10 may be similarly constructed in a 60/40 split arrangement. Accordingly, the user may only be required to lift the sitting portion 22 of the seat corresponding to the storage compartment being accessed. With the sitting portion 22 of the seat lifted, the user has access to the storage accessory 10. In this configuration, the user may simply access the storage accessory 10 by opening the lids 70, 72 of one or both storage compartments 40, 42, as shown in FIG. 10c. The user may also choose to remove the first storage compartment 40 by first unlocking the lock handle 106 as shown in FIG. 10d, and grasping the lock handle 106 to lift and remove the first storage compartment 40 from the tray assembly 90 as shown in FIGS. 10e and 10f.

Figure 11:
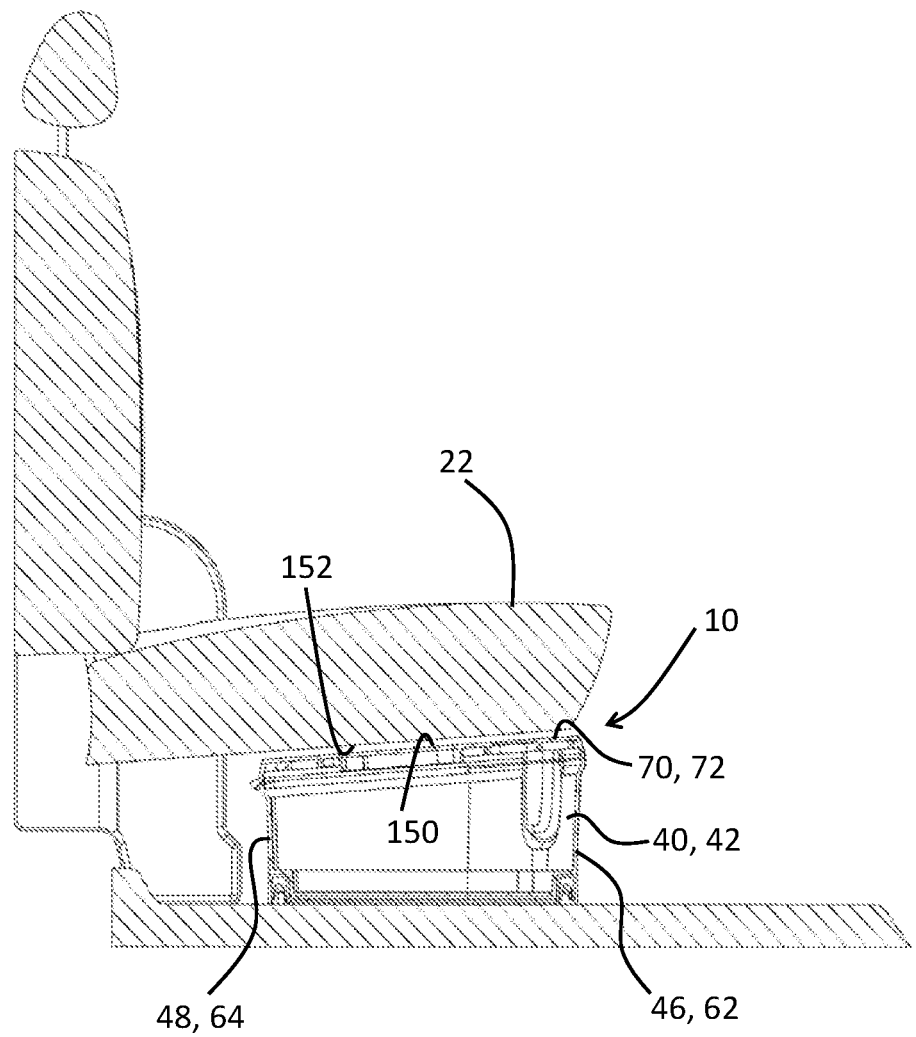
FIG. 11 is a side sectional view of the storage assembly of FIG. 2, showing the placement and gap spacing between a topside surface of the lids and an underside contour of a sitting portion of the seats.

To maximize the potential storage capacity of the storage accessory, each of the first and second storage compartments is configured to approximate the underside contours of the sitting portion of the seat. For instance, with reference to FIG. 11, the storage accessory 10 is shown to be configured in a manner that includes the C1 and C2 lids 70, 72 with a minimal gap between a topside surface 150 thereof and the underside contour 152 of the sitting portion 22 of the seat. To achieve this, each of the first and second storage compartments 40, 42 is dimensioned to include the respective rearward wall 48, 64 as being shorter compared to the respective forward wall 46, 62 in an amount that achieves the required slope. In this way, the storage accessory 10 is said to fit under the second row of seats with a substantially zero gap spacing between the topside surface 150 and the underside contour 152 of the sitting portion of the seat, therein increasing the available storage capacity of the storage accessory.

Materials/Manufacture

The first and second storage compartments 40, 42 and associated removable walls or dividers 52, 68, 120 may be made of materials including, but not limited to carbon steel, aluminum or its alloys, and/or engineered plastics including polyamide (PA), HDPE, ABS, PC-ABS, PP, or glass-fiber or carbon fiber reinforced composites of such materials, or composite sandwich materials. Composite sandwich laminate structures such as reinforced paper, metal or polymer honeycomb boards (PCB) may also be used in the construction of the first and second storage compartments 40, 42 and associated removable walls/dividers 52, 68, 120. The components may additionally include features that serve to provide structural reinforcement or lightweighting characteristics, such as the use of honeycomb reinforcement ribbing, as shown in FIG. 9.

All components of the storage assembly may be manufactured by one or more manufacturing methods including, but not limited to, injection molding, compression molding, thermoforming, stamping, compression or thermoformed, vacuum forming, CNC milling, extrusion, blow-molding, or casting.

Utility of Storage Accessory

The storage accessory 10 permits the available space beneath the second row of seats 20 to be used in a variety of ways. For instance, the available space may be used in an open configuration, where one or both storage compartments are removed, and available to the user is the water-proof/water-resistant tray assembly. The user may also use the space in a partially closed configuration, where one or both of the storage compartments are located on the tray assembly, and are being used with the sitting portion 22 of the seats remaining up, and the lids of one or both compartments remain in the open position, to accommodate larger items. The user may also use the space in a fully closed configuration, where both storage compartments are in place upon the tray assembly, and are being used with the lids of each compartment in the fully closed position, enabling the sitting portion 22 of the seats to be in the down position. These various modes of use provide maximum flexibility to the user, who may wish to transport items that include, but are not limited to jumper cables, flash-lights, bags, fire-arms, hunting accessories, rope, sports equipment, and consumer electronics goods.

Alternatives

In some embodiments, one or both sections of the storage accessory may contain added lighting features to provide illumination to the interior of the storage box.

In some embodiments, the storage accessory and/or specific components thereof may contain features to promote additional functions such as noise abatement or absorption, vibration dampening, structural reinforcement, audio features such as speakers and lighting features such as interior accents.

It will be appreciated that the tray assembly may be installed either on top of the vehicle floor carpet, or without the vehicle floor carpet.

Figure 12:
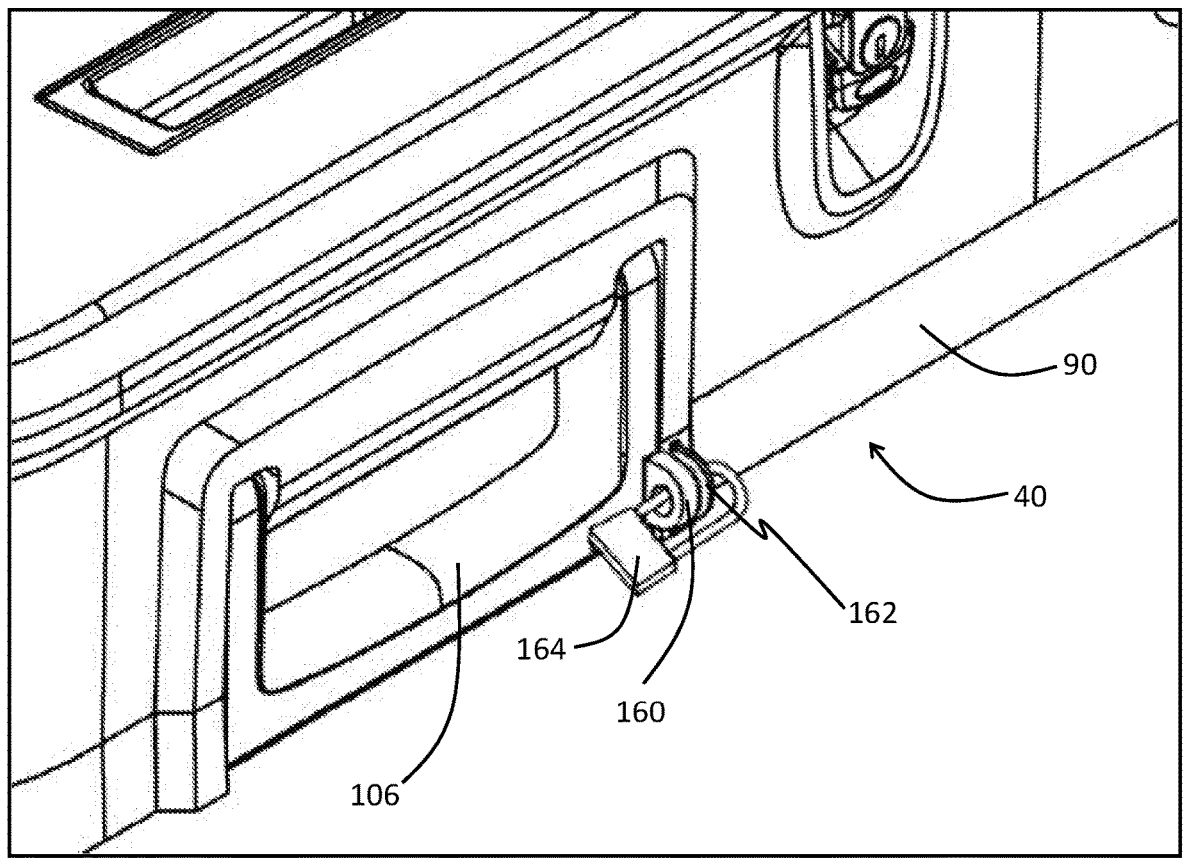
FIG. 12 is a perspective view that details an optional latch assembly for releasably attaching the first storage compartment to the tray assembly.

In some embodiments, the removable first storage compartment 40 may be provided with a locking or latch mechanism to prevent the first storage compartment 40 from dislodging from the tray assembly 90 inadvertently, or from being stolen. With reference to FIG. 12, shown is an exemplary latch mechanism that may be implemented as an extra security measure. As shown, the latch mechanism includes a first latch element 160 formed as part of the lock handle 106, and a second latch element 162 that is affixed to the tray assembly 90, in particular the frame member 94. On closure of the lock handle 106 to the engaged position, a padlock or similar locking device 164 can be used to lock the first and second latch elements 160, 162 together, as shown. Accordingly, when locked together, the lock handle 106 cannot be moved to the disengaged position, therein preventing the storage compartment 40 from being removed from the tray assembly 90.

Figure 13:
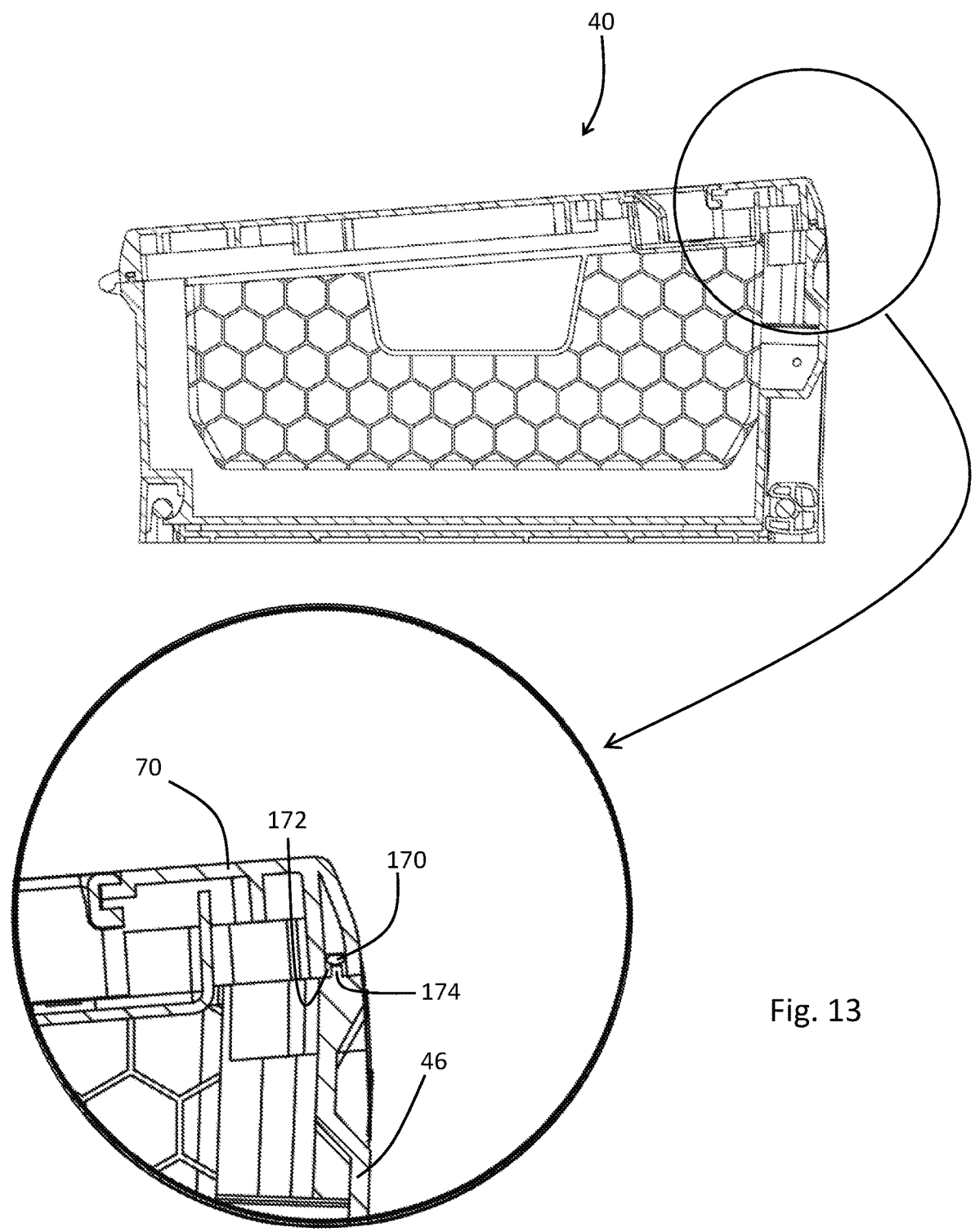
FIG. 13 is a partial sectional view of an exemplary sealing arrangement for preventing the ingress of water into the storage compartments.

In some embodiments, one or both of the storage compartments 40, 42 may incorporate features to prevent the ingress of water therein. For instance, the interface between the lid and the upstanding vertical walls may be configured to include a gasket or sealing member that prevents the ingress of water when the storage compartment is in the closed position. With reference to FIG. 13, an exemplary arrangement is shown, where a seal 170 is located in a groove 172 provided in the respective lids 70, 72, and the vertical walls around the periphery of the storage accessory 10 are provided with a seal engagement element 174. On closure of the lids 70, 72 upon the respective first and second storage compartments 40, 42, the seal engagement element 174 engages the seal 170 in the respective lid 70, 72 to prevent the ingress of water. It will be appreciated that the sealing feature, where used, may take on a variety of forms, and that the arrangement detailed here is merely exemplary. In other embodiments, the interface between the lids and the vertical walls around the periphery of the storage accessory may incorporate a lip and groove feature to prevent the ingress of water therein.

While various embodiments have been described above, it should be understood that they have been presented only as illustrations and examples of the present disclosure, and not by way of limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A storage accessory for placement under a vehicle seat of a vehicle, the storage accessory comprising;
    a first storage compartment;
    a second storage compartment; and
    a tray assembly for supporting the first storage compartment and the second storage compartment,
    wherein at least one of the first storage compartment and the second storage compartment is removable from the tray assembly to serve as a stand-alone storage box when removed from the vehicle, and
    wherein the at least one removeable storage compartment includes a lock handle that permits the at least one removeable storage compartment to be releasably and securely attached to the tray assembly.

2. The storage accessory according to claim 1, wherein each of the first storage compartment and the second storage compartment is defined by a bottom wall, a forward wall, a rearward wall, a first side wall and a second side wall, and wherein each of the first storage compartment and the second storage compartment also includes a respective lid to define an enclosed space therein.

3. The storage accessory according to claim 2, wherein the storage accessory is subdivided in accordance with a 60/40 split-seat convention, and wherein the first storage compartment is the at least one removable storage component, and the second storage compartment is fixedly attached to the tray assembly, and wherein the second storage compartment is configured as a larger compartment of the storage accessory.

4. The storage accessory according to claim 3, wherein the second storage compartment includes a removable divider wall to subdivide the second storage compartment into a first sub-compartment and a second sub-compartment.

5. The storage accessory according to claim 4, wherein the second side wall of each of the first storage compartment and the second storage compartment is positioned adjacent to each other, and wherein the second side wall of each of the first storage compartment and the second storage compartment is removable to provide a user with the option of a larger interior volume for the storage accessory.

6. The storage accessory according to claim 3, wherein the tray assembly includes a frame member and a mounting pan, and wherein the frame member is affixed to a vehicle floor of the vehicle and the mounting pan is attached to the frame member.

7. The storage accessory according to claim 6, wherein the frame member is in the form of a metallic rod configured to be received within a channel provided around a periphery of the mounting pan, the channel also defining a central recessed area for receiving the first storage compartment and the second storage compartment.

8. The storage accessory according to claim 7, wherein the lock handle is provided on the forward wall of the first storage compartment, and wherein the lock handle includes a lock channel that is configured to engage the frame member in a locked position and is configured to disengage from the frame member in an unlocked position.

9. The storage accessory according to claim 7, wherein the rear wall of the first storage compartment includes a registration boss that is received in a corresponding registration recess provided in the channel of the mounting pan, thereby preventing the first storage compartment from being lifted from the tray assembly until the lock handle is disengaged, and wherein the first storage compartment is configured to be tilted and displaced forwardly from the mounting pan.

10. The storage accessory according to claim 5, wherein the lid of the first storage compartment includes a first wall storage recess to store the removable second side wall of the first storage compartment, and wherein the lid of the second storage compartment includes a second wall storage recess to store the removable second side wall of the second storage compartment and a divider storage recess to store the removable divider wall of the second storage compartment.

11. The storage accessory according to claim 3, wherein each of the first storage compartment and the second storage compartment is dimensioned to align a topside surface of the lid adjacent to an underside contour of a sitting portion of the vehicle seat.

12. The storage accessory according to claim 11, wherein a substantially zero gap spacing is provided between each topside surface of each lid and the underside contour of the sitting portion of the vehicle seat.

* * * * *